United States Patent [19]
Gay

[11] Patent Number: 5,251,428
[45] Date of Patent: Oct. 12, 1993

[54] SICKLE-BAR MOWER

[75] Inventor: Benjamin A. Gay, Tryon, N.C.

[73] Assignee: Servo-Mechanical Systems, Inc., Tyron, N.C.

[21] Appl. No.: 793,553

[22] Filed: Nov. 18, 1991

[51] Int. Cl.$^5$ .............................................. A01G 3/04
[52] U.S. Cl. ..................................... 56/16.7; 56/2; 56/237; 30/122
[58] Field of Search ................... 56/2, 16.7, 236, 237, 56/300, 301; 30/122; 172/249, 247, 254

[56] References Cited

U.S. PATENT DOCUMENTS

| | | | |
|---|---|---|---|
| 2,502,943 | 4/1950 | Gordon | 56/2 |
| 2,702,978 | 3/1955 | Fowler | 56/2 X |
| 2,864,293 | 12/1958 | Edrich et al. | 172/247 X |
| 2,975,839 | 3/1961 | Burrows et al. | 172/247 X |
| 3,744,569 | 7/1973 | Ehrlich | 172/247 X |
| 3,931,859 | 1/1976 | van der Lely | 172/247 |
| 4,018,037 | 4/1977 | Weber | 56/16.7 |
| 4,597,203 | 7/1986 | Middleton | 172/247 X |
| 5,070,685 | 12/1991 | Galt | 56/16.7 |

Primary Examiner—George A. Suchfield
Attorney, Agent, or Firm—Cort Flint; Henry S. Jaudon

[57] ABSTRACT

A multi-purpose yard maintenance apparatus consisting of a sickle-bar mower, a sickle-bar hedge trimmer and a garden tiller. The apparatus comprises a gasoline engine and a handle assembly having a pair of handles The apparatus further comprises a sickle-bar frame assembly having handle mounting means, sickle-bar hedge trimmer mounting means and a pair of wheels. Also included is a tiller housing assembly having handle mounting means, engine mounting means and a set of tines Finally, a sickle-bar hedge trimmer assembly having a housing, a engine mounting means, a pair of handles and a sickle-bar cutting assembly is provided to complete the components of the apparatus. In use the tiller housing assembly, the gasoline engine, and the handle assembly may be used separately as a tiller or the hedge trimmer assembly and the gasoline engine may be used separately as a hedge trimmer or the hedge trimmer assembly, the gasoline engine and the handle assembly may be used in combination with the sickle-bar frame assembly as a sickle-bar mower.

16 Claims, 4 Drawing Sheets

SICKLE-BAR MOWER

BACKGROUND OF THE INVENTION

This invention relates to multi-purpose yard maintenance apparatus which is powered by a light weight gasoline engine.

At the present time there are several multi-purpose machines available. One such arrangement is taught in U.S. Pat. No. 2,535,614 to Van Ausdall Here a gasoline engine powered tractor unit is equipped to have cultivator plows attached to a rear section or a reel lawn mower attached to a forward section. This piece of equipment is very heavy, has a limited range of uses and is relatively expensive.

U.S. Pat. No. 4, 597,203 is directed to convertible yard maintenance equipment with the primary unit comprising a snow blower. The powered system of the equipment is designed to attach with a rotary mower unit, a vacuum unit, an edging unit, a tiller assembly, a blower unit or a sprayer assembly. Again all of this equipment is relatively expensive and very heavy and bulky.

U.S. Pat. No. 2,502,943 to Gordon is directed to a sickle-bar hedge trimmer which may be attached to a frame having a handle and a pair of wheels for use as a sickle-bar mower. Here the sickle-bar mechanism is driven by an electrical motor and the wheeled frame handle unit has but one use.

It is the object of the present invention to overcome the drawbacks of the prior art arrangements discussed above.

It is a further object of the invention to provide an inexpensive attachment which broadens the range of use of a multi-purpose yard maintenance piece of equipment.

It is a further object of the invention to provide a light weight sickle-bar mower arrangement for use with multi-purpose yard equipment.

It is another object of the invention to provide a safe and effective mower for use with under growth including high grass, vines, weeds, and brush.

Another object of the invention is to provide a light weight sickle-bar mower which is safe to operate on steep slopes.

SUMMARY OF THE INVENTION

An adaptor frame for converting yard equipment capable of multi-purpose work into a sickle-bar mowing machine. The frame comprises a horizontal bar having a downwardly extending projection arranged at each end. Each of the projections has secured thereon means to mount a wheel. The horizontal bar includes at least a first and a second mounting means. The first mounting means is adapted to secure a pair of handles to the adaptor frame and the second mounting means is adapted to secure a sickle-bar hedge trimmer to the frame. When assembled, a sickle-bar mowing machine is formed.

The sickle-bar hedge trimmer includes a gasoline engine arranged to drive the cutting blades of the sickle-bar hedge trimmer. There are control mechanisms for the engine.

The handles include hand grips and control means. The control means are adapted to connect with the engine control mechanisms when the engine is secured adjacent to said handles so as to provide engine control at the hand grips.

The first mounting means of the adaptor frame comprises a pair of C-shaped receiving grooves having apertures formed therein which receive securing bolts for passing through the adaptor frame apertures or grooves and matching apertures in the handles so that the handles are securely fastened to the adaptor frame.

The second mounting means includes a rod secured adjacent to one edge of the horizontal bar and arranged to be substantially perpendicular of the longitudinal axis of the horizontal bar and the arms. The rod is adapted to be received and held in a C-shaped groove by a C clamp both provided on the engine. The second mounting C-shaped groove and clamp are adapted to receive handle means secured intermediate of the sickle-bar blade. When secured in place the sickle-bar hedge trimmer is firmly fastened to said adaptor frame.

A multi-purpose yard maintenance apparatus consisting of a sickle-bar mower, a sickle-bar hedge trimmer and a garden tiller. The apparatus comprises a gasoline engine and a handle assembly having a pair of handles. The apparatus further comprises a sickle-bar frame assembly having handle mounting means, sickle-bar hedge trimmer mounting means and a pair of wheels. Also included is a tiller housing assembly having handle mounting means, engine mounting means and a set of tines. Finally, a sickle-bar hedge trimmer assembly having a housing, a engine mounting means, a pair of handles and a sickle-bar cutting assembly is provided to complete the components of the apparatus. In use the tiller housing assembly, the gasoline engine, and the handle assembly may be used separately as a tiller or the hedge trimmer assembly and the gasoline engine may be used separately as a hedge trimmer or the hedge trimmer assembly, the gasoline engine and the handle assembly may be used in combination with the sickle-bar frame assembly as a sickle-bar mower.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

At the present time there are several multi-purpose yard maintenance systems available. One such system is marketed by Mantis Manufacturing Co. of Huntington Valley, Pa. Another such system is marketed by Sears of Chicago, Ill.

Figure 2:
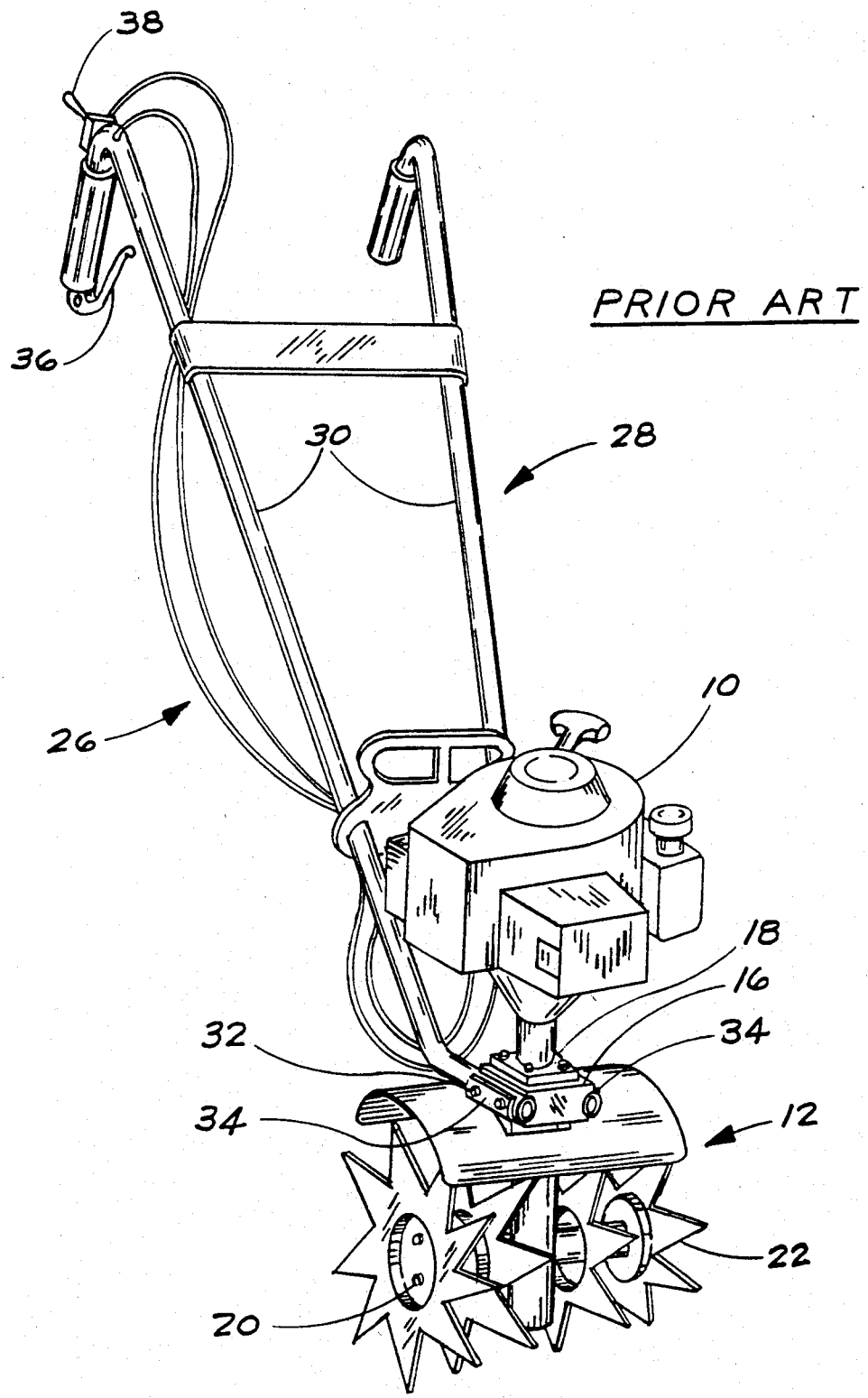
FIG. 2 is a perspective view of a tiller of the multi-purpose yard maintenance apparatus of the invention.
Figure 3:
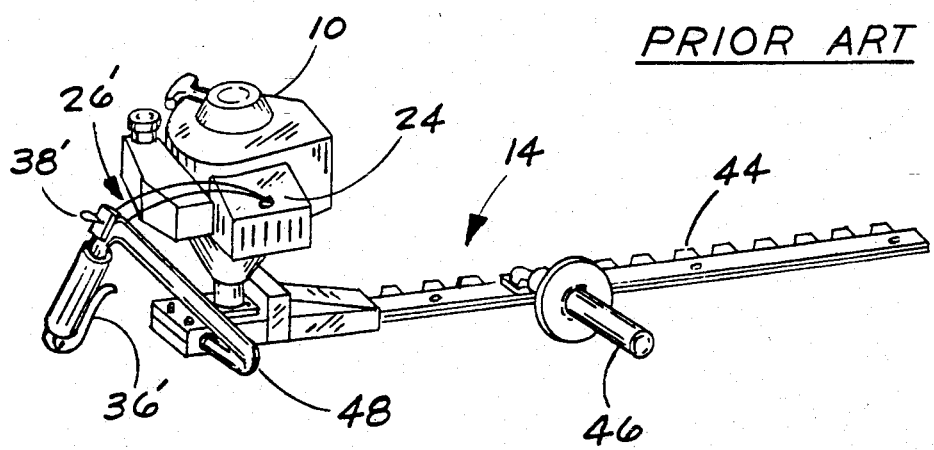
FIG. 3 is a perspective view of the hedge trimmer of the multi-purpose yard maintenance equipment of the invention.

The Mantis arrangement is similar to the apparatus shown in FIGS. 2 and 3, and includes a gasoline powered two cycle engine 10 which weighs only 2½ lbs The device includes a tiller unit 12 and a sickle-bar hedge trimmer unit 14. There are other attachments also available such as a lawn aerator, an edger and a de-thatcher which are not shown.

The instant invention is directed to a multi-purpose apparatus as shown in FIGS. 1-6. The arrangement of the invention includes a tiller assembly 12 having a housing 16 which mounts with gasoline engine 10 at 18. The housing includes gearing which drives shaft 20 and on which tines 22 are mounted. Engine 10 includes control mechanism 24 which is attached to control means 26 mounted on handle assembly 28. The handle assembly includes two handles 30 which attach at 32 to tiller assembly 12 by means of two C-shaped slots and C clamps 34. The control means 26 are attached to the engine control mechanism 24 so that the RPMs of the engine are controlled by lever 36 and on/off is controlled by switch 38, both located at the grip end of the handle assembly.

When it is desired to utilize hedge trimmer 14, engine 10 is disconnected from the tiller assembly 12 and connected with the hedge trimmer assembly. The hedge trimmer assembly includes a gear assembly 40 to which engine 10 is connected at 42. Sickle-bar blades 14 are attached to gear assembly 40 and are driven thereby in known manner. Gear assembly 40 removably mounts a handle 48. Attached to handle 48 are supplemental engine control means 26' which connect with engine control mechanism 24. Sickle bar blades 44 have a handle 46 attached substantially mid-way their length which is arranged to extend perpendicularly away from the cutting edge as shown in FIG. 3. The engine control lever 36' is utilized to control the RPMs of the engine, when associated with the hedge trimmer assembly which control switch 38' operate engine on/off. Both the control lever and switch 36' and 38' are connected with control mechanism 24 via control means 26'.

The above described equipment is known in the art. The invention resides in converting this equipment into a sturdy light weight sickle-bar mower. The referred to Mantis equipment is acceptable for use as the above described assemblies.

Figure 1:
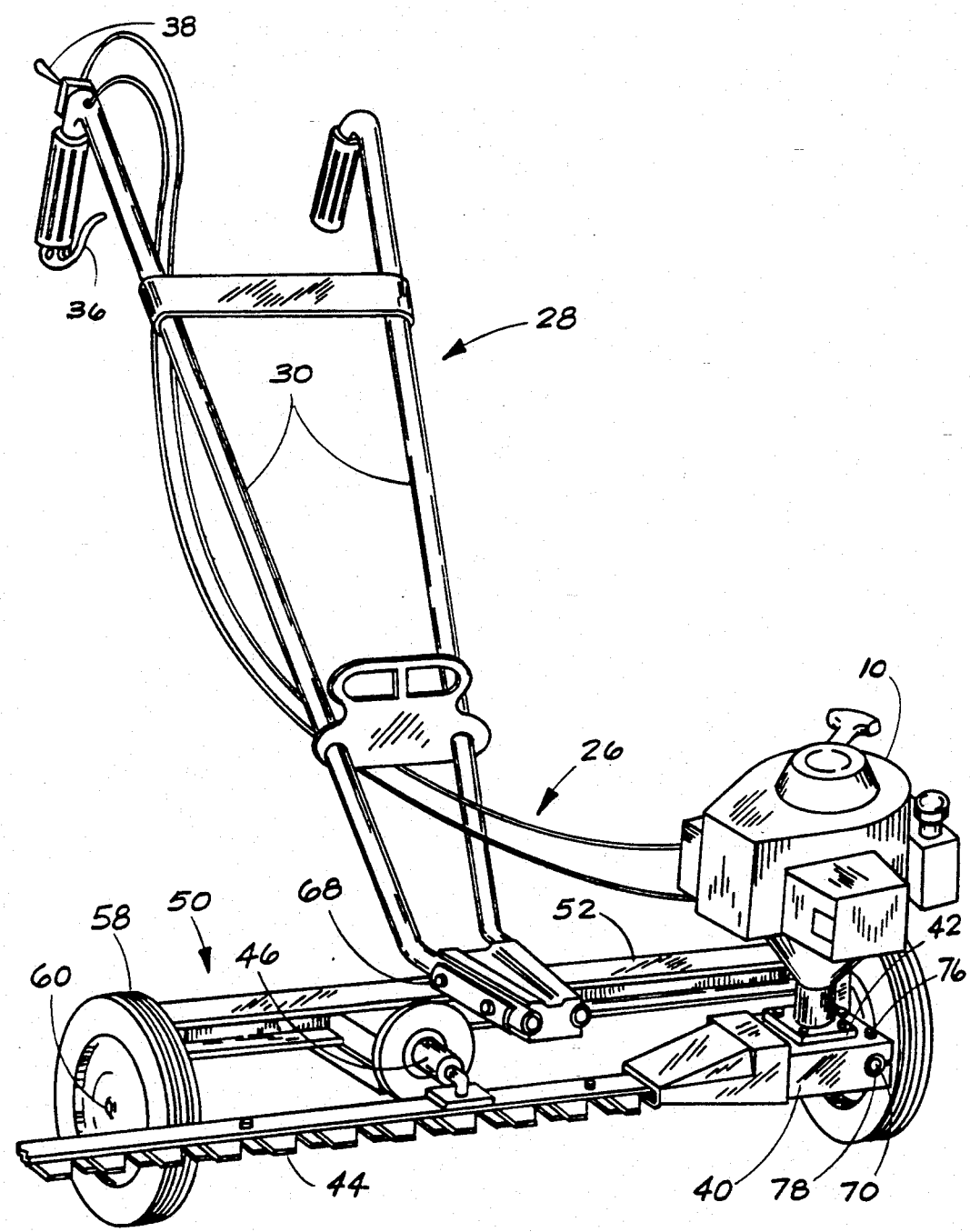
FIG. 1 is a perspective view of the sickle-bar mower of the invention.
Figure 6:
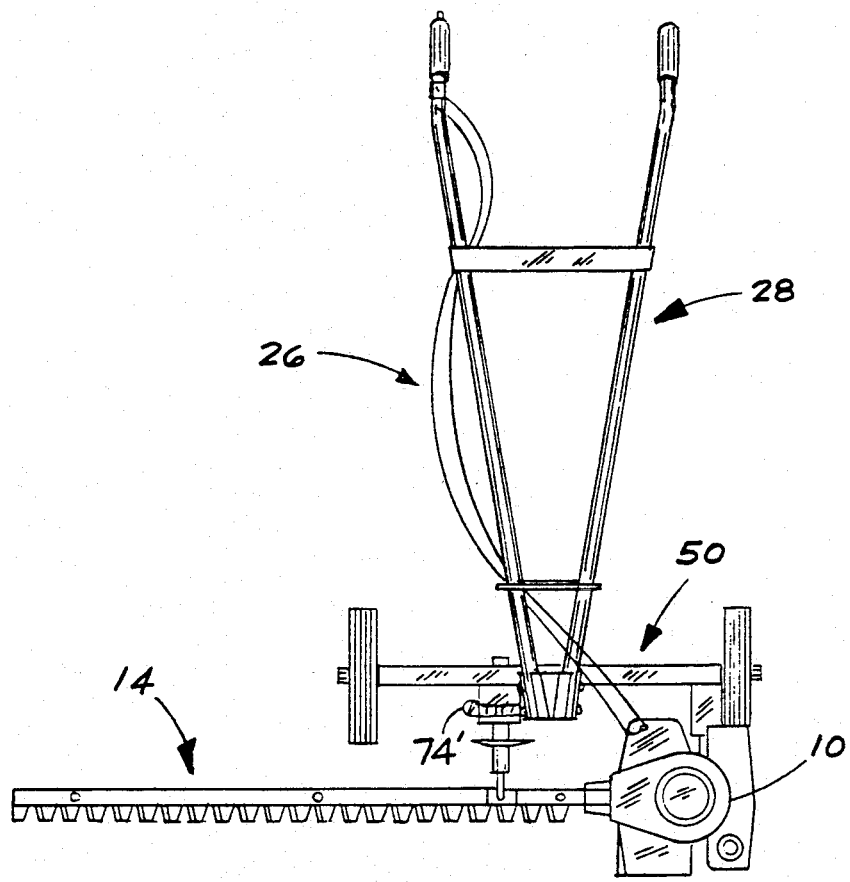
FIG. 6 is a top view of the sickle-bar mower of the invention.
Figure 4:
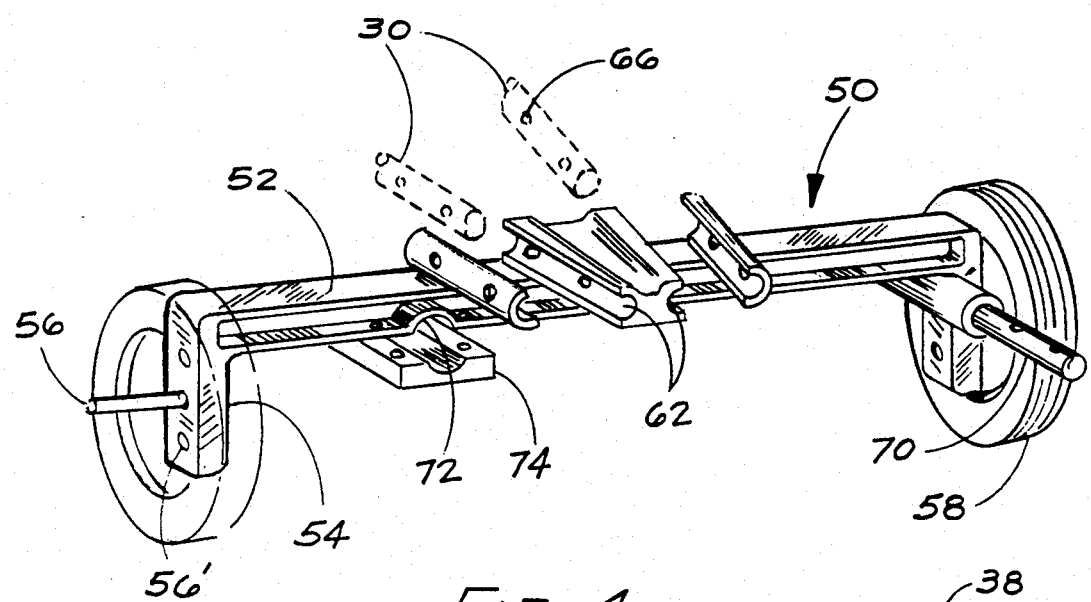
FIG. 4 is a perspective view of the adaptor unit of the invention.
Figure 5:
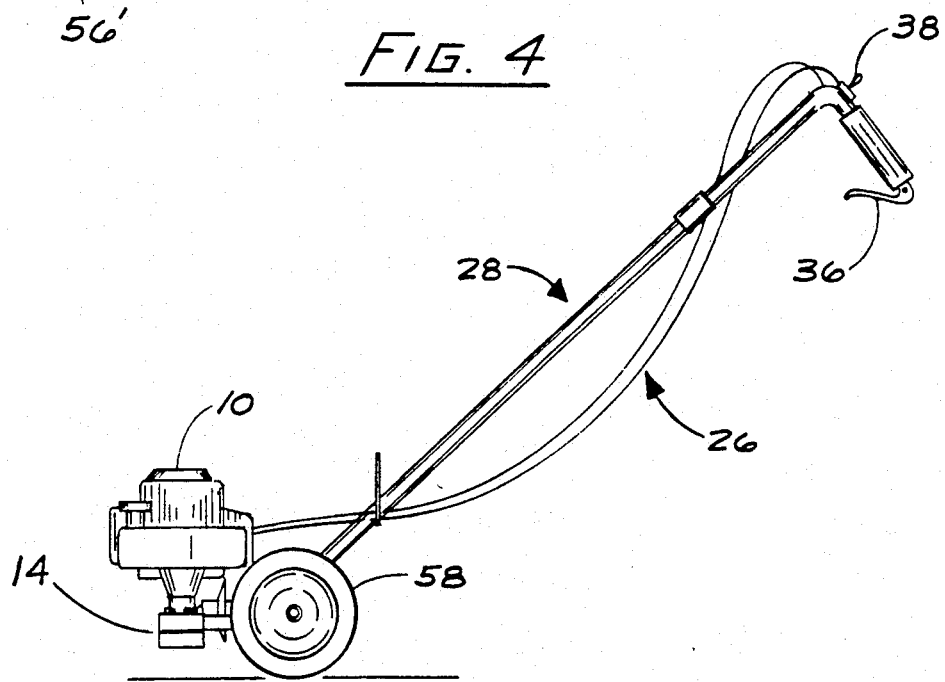
FIG. 5 is a side view of the sickle-bar mower of the invention.

When it is desired to operate a sickle-bar mowing mechanism as indicated in FIGS. 1, 5 and 6, sickle-bar frame 50, best shown in FIG. 4 is utilized Frame 50 includes elongated horizontal bar 52 having projections 54 formed at each end thereof. Projections 54 extend downwardly along a plane which is generally perpendicular to the plane of horizontal bar 52. Projections 54 are provided with means, preferably axles 56, which are adapted to mount wheels 58. Standard axle nuts 60 retain wheels 58 on axles 56. Means such as multiple bores 56' may be provided to vertically adjust axles 56 along 54 as shown in FIG. 4. Intermediate the upper surface of bar 52 are formed a pair of C slots 62 having apertures 66 formed therein. C slots 62 are adapted to receive the ends of handles 30 which have matching apertures 66 therein. Bolts 68 are passed through apertures 64 and 66 to firmly affix handles 30 on sickle-bar frame 50. An alternative arrangement would be to provide slots at opposite ends of the C slots 62 to receive bolts 68. Adjacent one edge of bar 52 a rod or tube 70 is secured to extend perpendicularly of the axis of both bar 52 and extensions 54. Approximately intermediate of bar 52 and along its under side is formed a C slot 72 whose axis extends along a plane parallel with that of rod 70. C clamp 74 is provided to cooperate with C slot 72. Optionally C slot 72 could be formed along the top of bar 52. Also, a hose or ring clamp 74' as shown in FIG. 6 could be employed to secure handle 46 to bar 52.

Rod 70 and C slot 72 as best seen in FIGS. 1 and 3 are adapted to secure sickle-bar hedge trimmer 14 to frame 50. Rod 70 is located to be receive in slot 78 formed in housing 40. Both housing 40 and rod 70 have a pair of apertures through which bolts 76 pass to firmly secure one end of the hedge trimmer to the frame 50 . Handle 46 is positioned in C slot 72 and secured therein by C-clamp 74. The engine control mechanism 24 is attached with the handle control means 26 so that engine 10 is controlled at the grip end of handles 30 by lever 36 and switch 38. The sickle-bar mower is now ready for use.

It is noted that frame 50 is formed of light weight metal. It may be either machined, cast or formed of bent tubing. The entire sickle bar mower arrangement weighs approximately 20 lbs. Because of the light weight, the apparatus is easily managed even on rough and hilly terrain. At the same time the arrangement is a very effective cutting apparatus.

While a preferred embodiment has been described utilizing a combustion engine as the power source, it is to be understood that the arrangement is suitably adaptable for use with equipment employing electric motors powered by alternating current or by direct battery current.

While a preferred embodiment of the invention has been described using specific terms, such description is for illustrative purposes only, and it is to be understood that changes and variations ma be made without departing from the spirit or scope of the following claims.

What is claimed is:

1. An adaptor frame for converting multi-purpose yard equipment into a sickle-bar mowing machine, said frame comprising a horizontal bar having substantially perpendicular projections arranged at each end thereof:
   each of said projections having means thereon to mount a wheel thereto;
   said horizontal bar including at least first and second mounting means;
   said first mounting means being adapted to secure a pair of handles to said adaptor frame and said second mounting means being adapted to secure a sickle-bar hedge trimmer to said adaptor frame; whereby,
   a sickle-bar mowing machine is formed.

2. The adaptor frame of claim 1 wherein said pair of handles include hand grips and control means.

3. The adapter frame of claim 2 wherein said sickle-bar hedge trimmer includes a gasoline engine having a control mechanism which is adapted to control operations of said engine.

4. The adapter frame of claim 3 wherein said handle control means are adapted to connect with said engine control mechanism when said sickle-bar hedge trimmer is secured to said horizontal bar thereby providing engine control at said hand grips.

5. The adapter frame of claim 1 wherein said first mounting means comprise a pair of C-shaped receiving grooves having means formed therein which receive securing bolts, said handles are provided with matching bolt receiving means whereby said handles may be securely fastened to said adaptor frame by passing bolts and securing them in said receiving means.

6. The adaptor frame of claim 1, wherein said second mounting means includes a rod secured adjacent to one end of said horizontal bar and arranged substantially perpendicularly of the longitudinal axis of said horizontal bar.
   said rod being adapted to be received and held in a slot provided on said engine.

7. The adapter frame of claim 6 wherein said second mounting means further includes a C-shaped groove and clamp arranged intermediate of said horizontal bar;
   said C-shaped groove and clamp being adapted to receive an appendage secured intermediate of said sickle-bar blade, whereby said sickle-bar hedge trimmer may be securely fastened to said adaptor frame.

8. The adapter frame of claim 1 wherein a wheel is rotably mounted on each of said wheel mounting means.

9. A multi-purpose yard maintenance apparatus consisting of the sickle-bar mower, a sickle-bar hedge trimmer and a garden tiller, said apparatus including;
   an engine;
   a handle assembly having a pair of handles;
   a sickle-bar hedge trimmer assembly having a housing, an engine mounting means, a pair of handles and a sickle-bar cutting assembly;
   a tiller housing assembly having handle assembly mounting means, engine mounting means and a set of tines; and
   a sickle-bar frame assembly having handle assembly mounting means, sickle-bar hedge trimmer mounting means and a pair of wheels; whereby,
   said hedge trimmer assembly and said engine may be used separately as a hedge trimmer;
   said tiller housing assembly, said engine and said handle assembly may be used separately as a tiller; and
   said hedge trimmer assembly, said engine, and said handle assembly may be used in combination with said sickle-bar frame assembly as a sickle-bar mower.

10. The multi-purpose apparatus of claim 9 wherein said handle assembly includes engine control means.

11. The multi-purpose apparatus of claim 10 wherein said engine control means are operative to control engine speed and engine on-off when associated with said sickle-bar frame assembly and said tiller housing assembly.

12. A multi-purpose yard maintenance apparatus consisting of the sickle-bar mower and a sickle-bar hedge trimmer said apparatus including;
   a sickle-bar hedge trimmer assembly having a housing, a engine mounting means mounting a gasoline engine, a pair of handles and a sickle-bar cutting assembly;
   a sickle-bar frame assembly having handle assembly mounting means, sickle-bar hedge trimmer mounting means and a pair of wheels;
   a handle assembly including a pair of handles secured to said handle assembly mounting means, whereby;
   said hedge trimmer assembly including said gasoline engine may be utilized as a hedge trimmer; and
   said hedge trimmer assembly including said gasoline engine may be used in combination with said sickle-bar frame assembly and said handle assembly as a sickle-bar mower.

13. The multi-purpose yard maintenance apparatus of claim 12 wherein said handle assembly includes engine control means which connect with said engine control means so that said gasoline engine may be controlled from said handle assembly.

14. The multi-purpose yard maintenance apparatus of claim 13 wherein said engine control mechanisms are secured adjacent to one of a pair of hand grips formed at one end of said handle assembly.

15. The multi-purpose yard maintenance apparatus of claim 12 wherein said sickle-bar frame assembly includes a frame member consisting of a horizontal bar having a pair of projections at each end thereof, said projections extending along a plane which is substantially perpendicular to the plane of said horizontal bar; and each of said projections having a wheel rotably mounted thereon.

16. The multi-purpose yard maintenance apparatus of claim 15 wherein said bar includes spaced mounting means for securing said handle assembly and said hedge trimmer assembly thereto and said projections include means to adjustably mount said wheels thereon.

* * * * *